United States Patent [19]

Hong et al.

[11] Patent Number: 5,509,111
[45] Date of Patent: Apr. 16, 1996

[54] COLOR IMAGE REGION MANAGEMENT SYSTEM AND COLOR IMAGE REGION MANAGEMENT METHOD AND COLOR IMAGE REGION RETRIEVAL METHOD

[75] Inventors: Jung-Kook Hong, Tokyo; Machiko Sato; Hiroyasu Takahashi, both of Yokohama, all of Japan

[73] Assignee: International Business Machines Corporation, Armonk, N.Y.

[21] Appl. No.: 446,273

[22] Filed: May 22, 1995

Related U.S. Application Data

[63] Continuation of Ser. No. 874,792, Apr. 27, 1992, abandoned.

[51] Int. Cl.$^6$ ................................................ G06T 11/00
[52] U.S. Cl. ........................................... 395/131; 395/132
[58] Field of Search ................................ 395/118, 131, 395/161, 132

[56] References Cited

U.S. PATENT DOCUMENTS

| | | | |
|---|---|---|---|
| 4,884,130 | 11/1989 | Huntsman | 358/118 X |
| 5,049,986 | 9/1991 | Aono et al. | 395/131 X |
| 5,103,407 | 4/1992 | Gabor | 395/131 |
| 5,222,206 | 6/1993 | Liao | 395/131 |
| 5,228,120 | 7/1993 | Farr et al. | 395/131 |

*Primary Examiner*—Heather R. Herndon
*Assistant Examiner*—Cliff Nguyen Vo
*Attorney, Agent, or Firm*—Ronald L. Drumheller

[57] ABSTRACT

A color image region management system suitable for retrieving a region having a specified color. Color class is determined for each picture element of image data in which the color data of each picture element is expressed by a trichromatic system. In the trichromatic system, it is determined to which color class the color of the picture element belongs of a plurality of color classes divided on the basis of a perceptual color system. There is a color index memory for constructing tree structure data reaching a root node with blocks each including at least one picture element as a leaf node, and calculating, for each node in the tree structure data and for each color class in regards to the picture elements included in the node, the frequency of picture elements having a color belonging to the color class. The calculated frequency of the picture elements is stored as a color index for each color class.

13 Claims, 11 Drawing Sheets

| $P_{x-1,\,y-1}$ | $P_{x,\,y-1}$ | $P_{x+1,\,y-1}$ |
|---|---|---|
| $P_{x-1,\,y}$ | $P_{x,\,y}$ | $P_{x+1,\,y}$ |
| $P_{x-1,\,y+1}$ | $P_{x,\,y+1}$ | $P_{x+1,\,y+1}$ |

FIG.5

LEVEL 0 (ROOT NODE)

(a) NODE        (b) BLOCK

FIG.6

LEVEL 1 (INTERMEDIATE NODE)

(a) NODE        (b) BLOCK

FIG.7

LEVEL 2 (INTERMEDIATE NODE)

(a) NODE   (b) BLOCK

FIG.8

LEVEL 3 (LEAF NODE)

(a) NODE   (b) BLOCK

SPECIFIED COLOR

FIG.16

COLOR IMAGE REGION MANAGEMENT SYSTEM AND COLOR IMAGE REGION MANAGEMENT METHOD AND COLOR IMAGE REGION RETRIEVAL METHOD

This is a continuation of application Ser. No. 07/874,792, filed Apr. 27, 1992, now abandoned.

TECHNICAL FIELD

The present invention is generally related to an image processing system, and more particularly to a method and system for managing a color image and a method and system for retrieving the region of such managed color image.

BACKGROUND OF THE INVENTION

In the field of color image processing, it is sometimes desired to apply the processing only to a certain region of interest, such as cutting out or color change of the object. Such requirement is strong particularly in the color image editing systems and painting systems which have rapidly been commercialized in personal computers or work stations. These are greatly different from the image processing in remote sensing systems or medical systems in which mainly the whole image is subject to processing, in that only a required portion needs to be processed. In such partial processing, it will be important in terms of processing efficiency and memory efficiency that a required portion can promptly be detected and the region can be read or written with as little loss in efficiency as possible. Accordingly, the data structure also needs to be suitable for such partial processing. This is particularly essential when the system is put into practical use for cases in which many objective regions exist in a still image, or many continuous frames are processed as in a moving image.

Color image data is typically stored as data of the three primary colors for each picture element in a two-dimensional array. In this case, as the value of a picture element is basically described as a function of position, in order to detect the region to be processed, it is required to read out the whole image and check whether the condition is fulfilled for each picture element.

Incidentally, as an effective method for handling graphical information and image data, there are a tree structure and a pyramid structure. For instance, if the data of a binary image is expressed by the tree structure, the region is more finely divided where information exists more densely, so that the image data can be efficiently managed and it is possible to fast retrieve whether a white or black picture element exists at a specified position. However, conversely, if an objective region, for instance, a region of white picture elements, is desired to be retrieved, all the nodes of the lowest level must eventually be examined. If information is very dense, the lowest level could be the picture element level. In this regard, the retrieval efficiency decreases because all the lowest level nodes must be traversed. Although the tree structure can also be applied to multivalued image data, is it similar in this respect.

On the other hand, the pyramid structure is effective when an image of lower resolution is processed and then an image of higher resolution is processed. However, because some information may be naturally lost in such an image of low resolution, this structure is not suitable for, for example, processing in which all the regions of white picture elements are to be retrieved.

The prior arts of the color processing of color image data include Japanese Patent Application Laid-Open No. 182786/1988 disclosing a technique for determination of edges in a specified objective region, Japanese Patent Application Laid-Open No. 184475/1988 disclosing a technique for selection of a representative color for dividing an objective region, and Japanese Patent Application Laid-Open No. 185163/1988 disclosing a technique for utilizing a color specification system other than the RGB color specification system in order to increase the color conversion, lightness-conversion and data compression rates. However, these prior arts do not suit retrieval of the region having a specified color, nor disclose a data management method therefor.

As described above, it is the problem of the prior art to enable a region having a specified color to be fast retrieved in a color image. Accordingly, it is the object of the present invention to provide a color image region management method suitable for retrieving a region having a specified color, and a retrieval method for fast retrieving the region having a specified color by the use of the color image management method.

DISCLOSURE OF THE INVENTION

In order to accomplish the above object, the color image region management system of the present invention is characterized by comprising: color class determination means for determining, for each picture element of image data in which the color data of each picture element is expressed by a trichromatic system, to which color class the color of the picture element belongs of a plurality of color classes divided on the basis of the perceptual color system, and color index memory means for constructing tree structure data reaching a root node with blocks each including at least one picture element as a leaf node, and calculating, for each node in said tree structure data and for each color class in regards to the picture elements included in the node, the frequency of picture elements having a color belonging to the color class, and storing the calculated frequency of the picture elements as a color index for each color class.

In order to accomplish the above object, the color image region management method of the present invention is characterized by comprising the steps of: converting the color data of each picture element of image data from a trichromatic system to a perceptual color system, dividing a color space based on the perceptual color system into a plurality of color classes, determining which color class of the plurality of color classes the color of the picture element belongs to, and constructing tree structure data reaching a root node with blocks each including at least one picture element as a leaf node, calculating, for each node in said tree structure data and for each color class in regards to the picture elements included in the node, the frequency of picture elements having a color belonging to the color class, and storing the calculated frequency of the picture element as a color index for each color class.

In order to accomplish the above object, the color image region management system of the present invention is characterized by comprising: an image input device for fetching an original image as image data expressed by trichromatic system, memory means for storing the image data expressed by the trichromatic system which is output from the image input device, color class determination means for determining, for each picture element of image data in which the color data of each picture element is expressed by the trichromatic system, to which color class the color of the picture element belongs of a plurality of color classes divided on the basis of the perceptual color system, and color index memory means for constructing tree structure data reaching a root node with blocks each including at least one picture element as a leaf node, and calculating, for each node in the tree structure data and for each color class in regards to the picture elements included in the node, the frequency of picture elements having a color belonging to the color class, and storing the calculated frequency of the picture elements as a color index for each color class.

In order to accomplish the above object, the color image region retrieval method of the present invention for retrieving a color image region by the use of the tree structure data constructed by the above described color image region management system is characterized by comprising the steps of: determining the color class to be retrieved on the basis of a specified color, searching the tree structure data for the determined color class, in each node other than the leaf node, stopping the search of the nodes lower than itself if the frequency of the picture elements belonging to the determined color class is zero, and otherwise continuing the search, and in the leaf node, storing the blocks corresponding to the leaf node as the color region to be detected if the frequency of the picture elements of the determined color class is larger than a predetermined value.

DESCRIPTION OF THE PREFERRED EMBODIMENT

Figure 2:
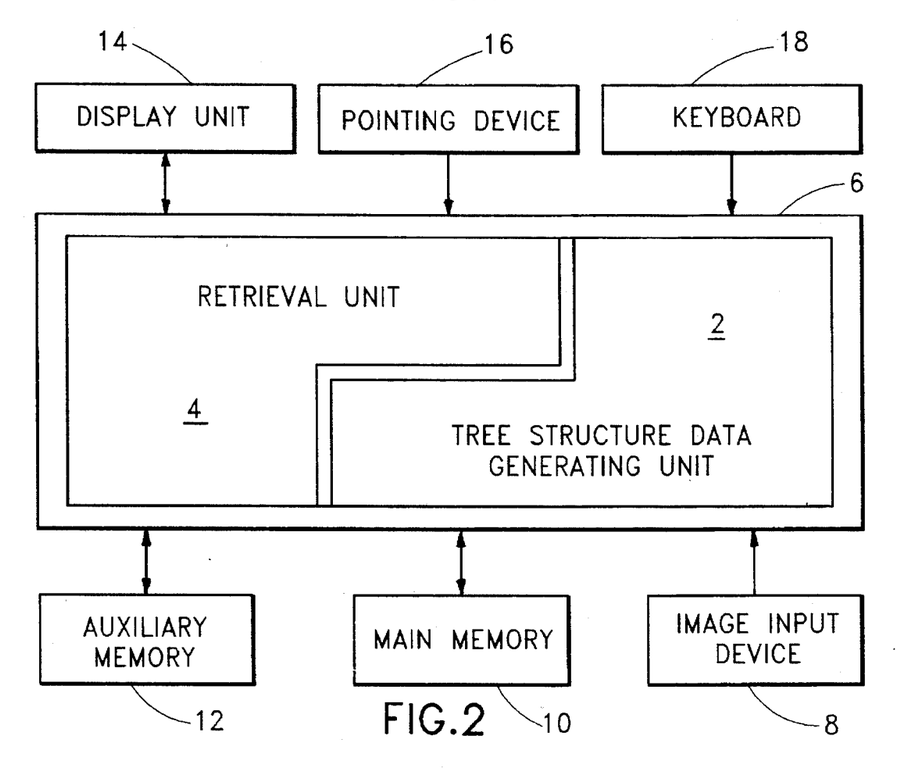
FIG. 2 is a diagram showing the construction of an embodiment of the image processing system to which the present invention is applied.

First, description is made to the general construction of an image processing system to which the present invention can be applied. The present invention can be incorporated in an image processing system as shown in FIG. 2. This system comprises image input device 8, main memory 10, auxiliary memory 12, image processor 6, display unit 14, keyboard 18 and pointing device 16, though of course the present invention is not limited to this construction. A color image (not shown) is converted to RGB data of a trichromatic system by image input device 8 such as color scanner and stored in auxiliary memory 12. The RGB data is converted to tree structure data provided with color indexes by image processor 6 to which the present invention is applied, and again stored in auxiliary memory 12. How to give color indexes is detailed later on. RGB data and tree structure data may be stored in different memories. For instance, RGB data may be stored in auxiliary memory 12, and tree structure data in main memory 10 in image processor 6. With this, the processing of image retrieval can be performed at a high speed because the data amount of tree structure data is much less as compared with that of RGB data. Image processor 6 includes tree structure data generating unit 2 according to the present invention.

Figure 1:
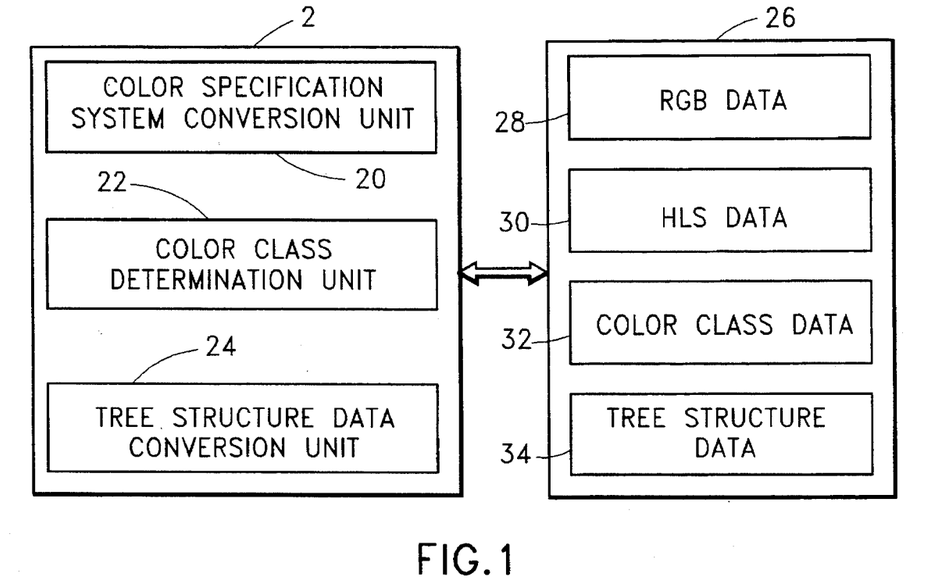
FIG. 1 is a diagram showing the construction of the tree structure data generating unit 2 of an embodiment according to the present invention.

In FIG. 1, the construction of tree structure data generating unit 2 is shown. Tree structure data generating unit 2 has color specification system conversion unit 20, color class determination unit 22 and tree structure data conversion unit 24. Incidentally, memory 26 in FIG. 1 collectively represents main memory 10 and auxiliary memory 12 in FIG. 2. Now, the functions of color specification system conversion unit 20, color class determination unit 22 and tree structure data conversion unit 24 are sequentially described, respectively.

Color specification system conversion unit 20 converts the color data of each picture element from color data of the trichromatic system expressed by three reference stimuli or primary colors to color data of a perceptual color system expressed by three attributes (hue, lightness and saturation). This color specification system conversion is performed as follows.

In this embodiment, by way of example, description is given of the conversion between the RGB color specification system, a trichromatic system, and CIE1976 (L*, a*, b*) uniform perceptual color space, a perceptual color system. Conversion from R, G, B to L*, a*, b* is performed according to the following equations.

$L^* = 116(Y/Y0)^{1/3} - 16$ $a^* = 500[(X/X0)^{1/3} - (Y/Y0)^{1/3}]$ $b^* = 200[(Y/Y0)^{1/3} - (Z/Z0)^{1/3}]$ $X = XrR + XgG + XbB$ $Y = YrR + YgG + YbB$ $Z = ZrR + ZgG + ZbB$ where, X, Y and Z represent three reference stimuli values, XO, YO and ZO represent three reference stimuli values of standard light, and Xr to Xb, Yr to Yb and Zr to Zb represent coefficients for conversion from the RGB color specification system to an XYZ color specification system.

In the CIE conference of 1975, the terms of metric hue-angle (symbol: H), metric lightness (symbol: L*) and metric chroma (symbol: C*) were proposed. H and C* correspond to hue and chroma, respectively, and are given by the following formula.

$$H = \tan^{-1}(b^*/a^*) \quad C = (a^{*2} + b^{*2})^{1/2}$$

In the present embodiment, these H, L* and C* are employed. For convenience of explanation, these H, L* and C* are called hue (symbol: H), lightness (symbol: L) and saturation (symbol: S), respectively, in this specification.

There are various chromatic systems and perceptual color systems in addition to the above, and the above conversion is merely an example. The present invention can apply between any trichromatic system and any perceptual color system. Color specification system conversion unit 20 may be comprises of a conversion table. In addition, if necessary, color specification system conversion unit 20 may further be provided with means for reverse conversion from a perceptual color system to a trichromatic system. Further, since chroma is sometimes used instead of saturation depending on the selection of a perceptual color system, the term "saturation" is intended to be used in this specification as a concept which includes both saturation and chroma. Also, depending on the selection of a perceptual color system, "chromaticness" simultaneously considering hue and saturation may be used, and the present invention can also apply to such perceptual color system.

Next, determination of the color class of each picture element by color class determination unit 22 is described. Color class determination unit 22 includes color space dividing means (not shown) for dividing a color space of a perceptual color system expressed by three elements of hue H, lightness L and saturation S into a plurality of regions (or color classes), and color class determination means (not shown) for determining which divisional region (color class) the color of each picture element belongs to. Although there are various ways of dividing by the color space dividing means, a color space is divided as follows in terms of practical use. Equal division is applied to the H- and L-directions, respectively. As to the S-direction, a color whose saturation is lower than a predetermined level is treated as achromatic. The reason for this is that, if a color of low saturation is treated as chromatic, it can be classified in quite a different hue by slight noise. By treating those of lower saturation than a predetermined level as achromatic in this way, reliability of color region retrieval can be enhanced.

Figure 3:
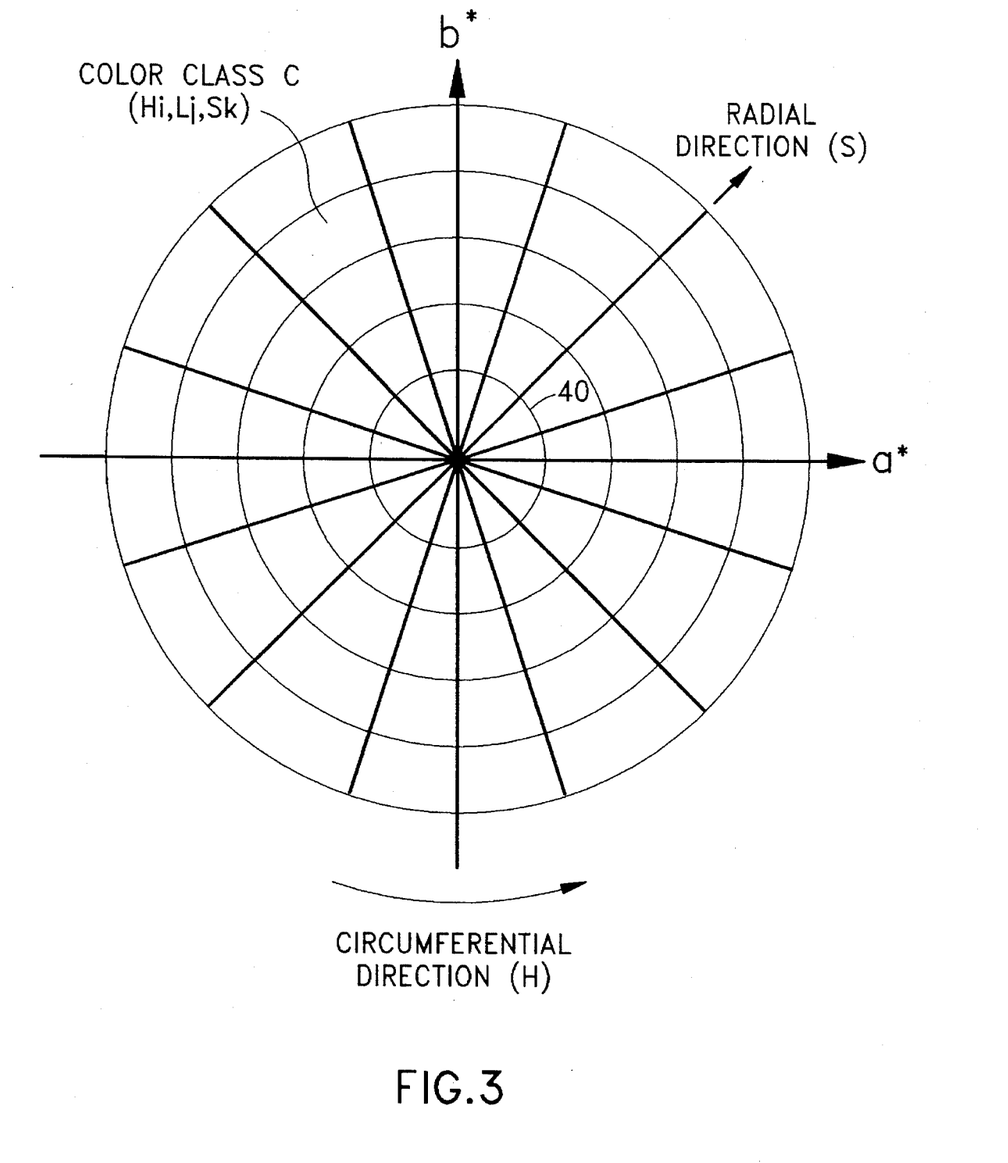
FIG. 3 is a representation showing an example of a color space divided into a plurality of regions according to the present invention.

In FIG. 3, an example of a color space divided into a plurality of regions as described above is shown. In FIG. 3, the direction perpendicular to the paper surface is the axis of L. The small circle in the center is a region in which saturations below a predetermined level are classified as achromatic. In the example of FIG. 3, the H-direction is divided into ten, the S-direction is divided into five (the chromatic portion is divided into four), and the L-direction is divided into four (not shown). The number of divisions i, j or k for the individual directions H, L and S may freely be set, respectively. Although, in this embodiment, the divisions of the H-, L- and S-directions (for the chromatic portion) are equal, they need not always be equal.

The color class determination means of color class determination unit 22 determines, as follows, to which region (or color class) of the above described color space belongs the color of each picture element, which is expressed by H, L and S converted from R, G and B by color specification system conversion unit 20. Now, it is supposed that the values of H, L and S of a given picture element are h, l and s. It is assumed that, if h belongs to the i-th region Hi of the H-direction, l belongs to the j-th region Lj of the L-direction and s belongs to k-th region Sk of the S-direction, then the color class of the picture element belongs to a color class C(Hi, Lj, Sk) which is determined by Hi, Lj and Sk. Incidentally, color classes may be allocated only to regions where the colors of the original image exist. For instance, supposing that the number of the divided regions of a color space is 200, if the colors of the picture elements of the original image exist in 50 regions of them, then the number of color classes is 50. Of course, if partial regions of the original image are painted over with a color which does not exist in the original image, then a divisional region is required for the color which does not exist in the original image, and thus, in such case, the number of color classes is to be the total number of divided regions regardless of whether or not the colors of the original image exist.

Figure 4:
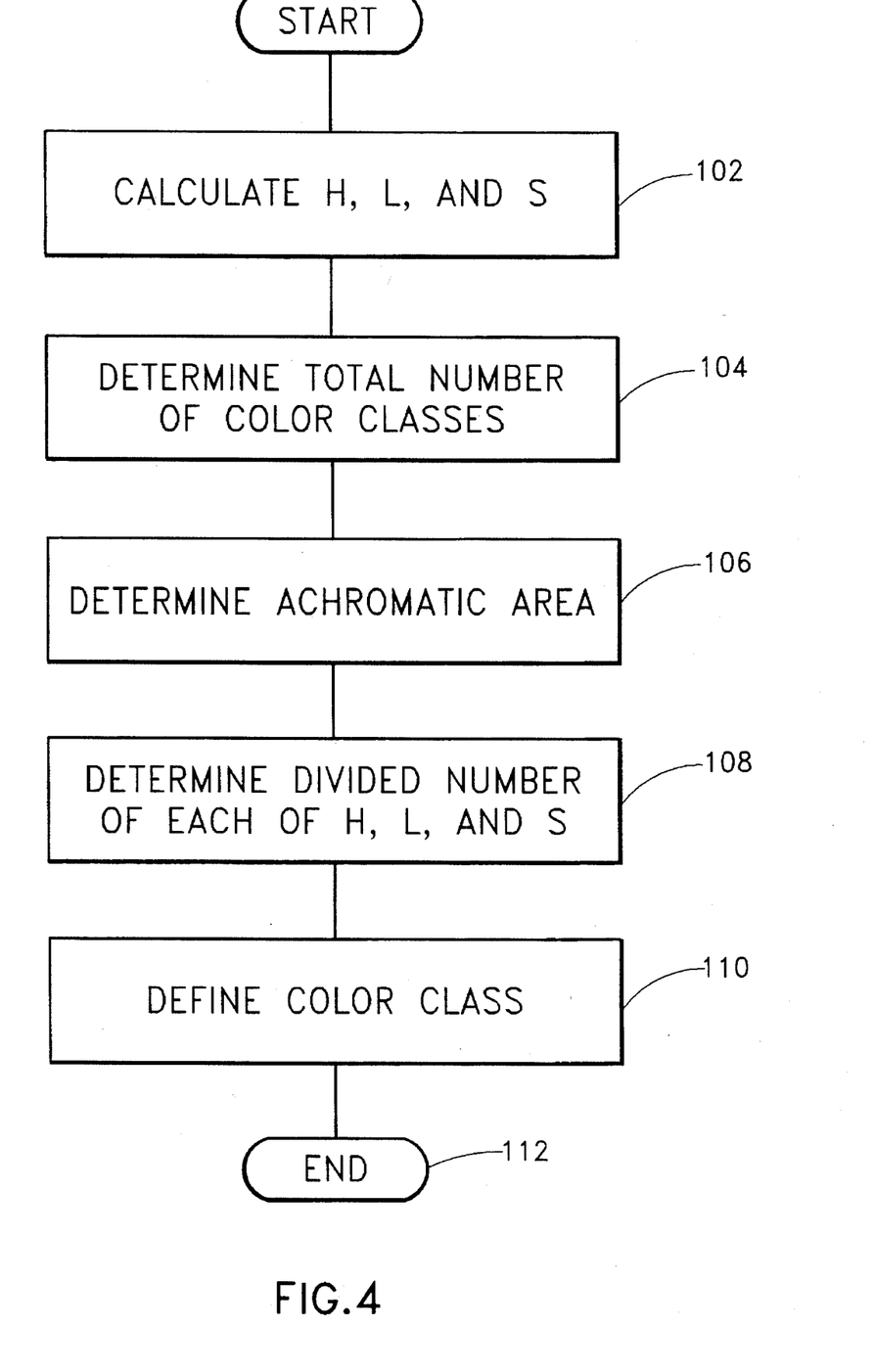
FIG. 4 is a flowchart for color class definition by an embodiment according to the present invention.

Steps 100 to 112 of FIG. 4 represent, by a simple flowchart, the conversion of a color specification system by color specification system conversion unit 20 and the dividing of a color space (definition of color classes) by color class determination unit 22 as described above.

When the color class (Hi, Lj, Sk) of each picture element is determined, reliability of the color region retrieval can be further increased by considering the values of H, L and S of picture elements in the neighborhood of the particular picture element.

Figure 5:
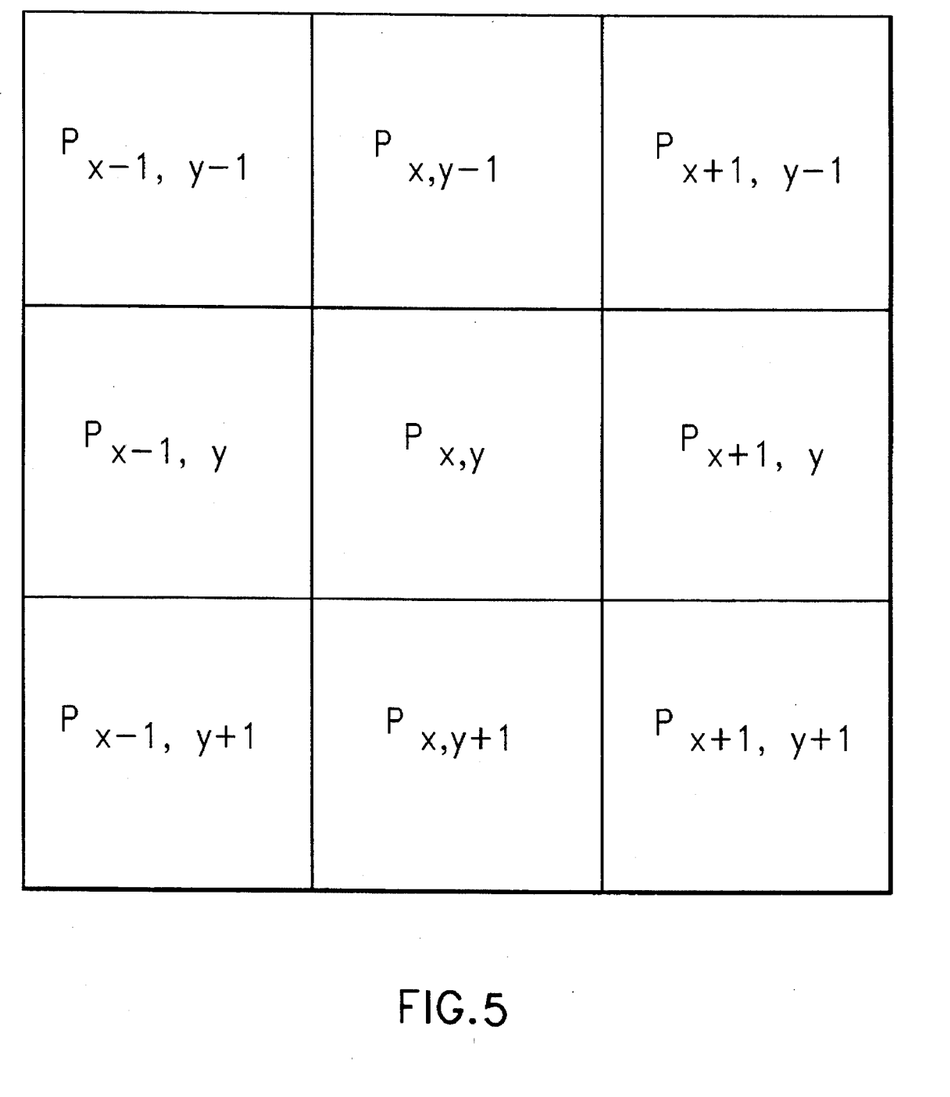
FIG. 5 is a representation showing neighboring picture elements which are taken into consideration in determination of the color class of a picture element.
Figure 6:
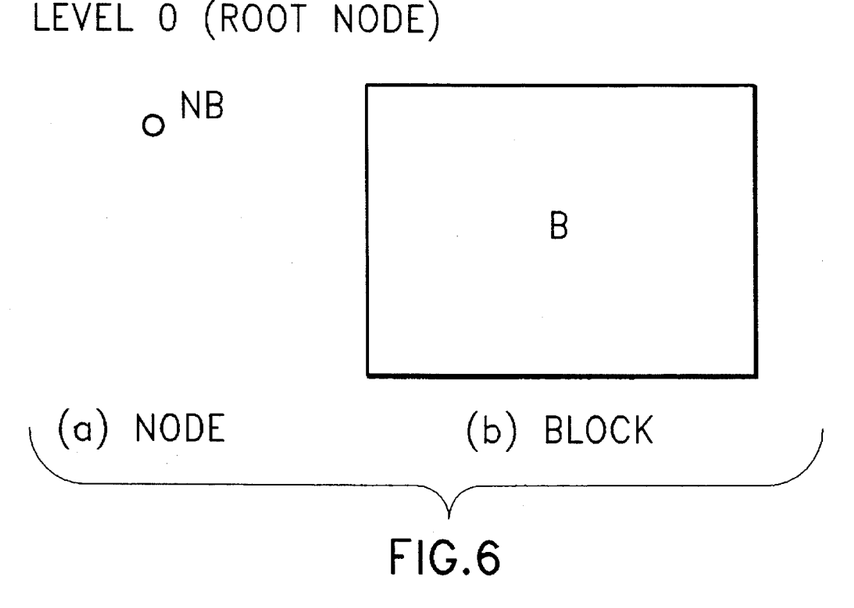
FIG. 6 is a representation conceptually showing the relationship between node and block as a root node of a tree structure.
Figure 7:
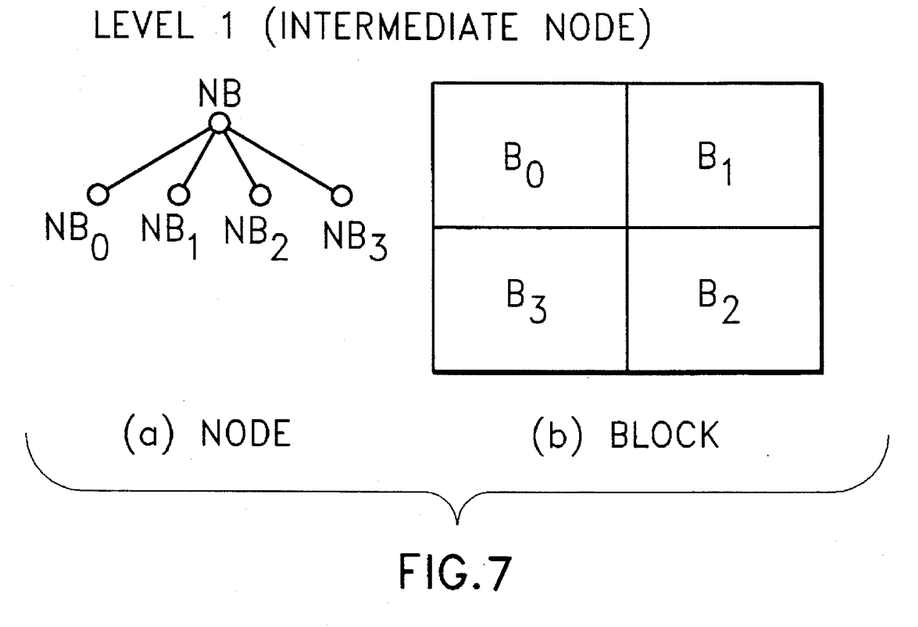
FIG. 7 is a representation conceptually showing the relationship between node and block at an intermediate node of a tree structure.
Figure 8:
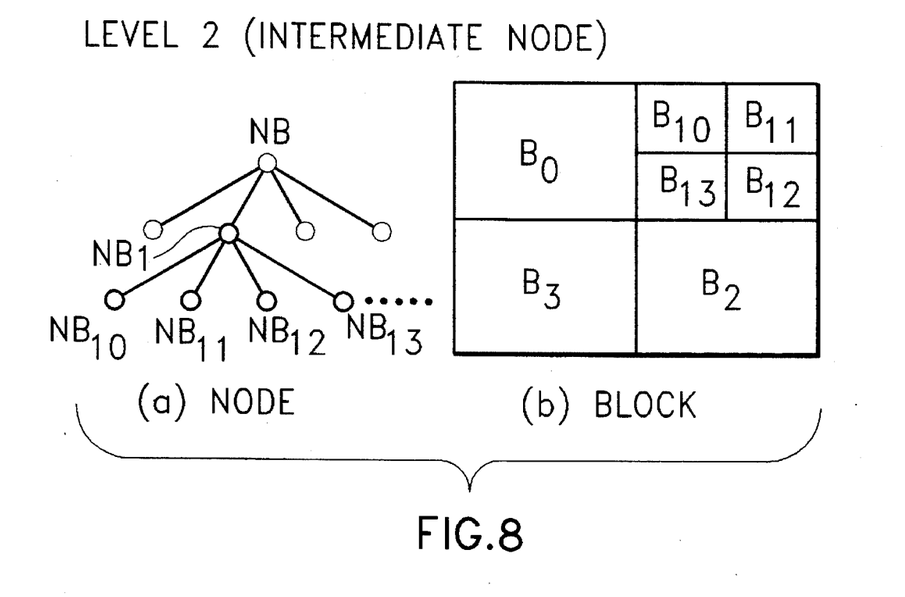
FIG. 8 is a representation conceptually showing the relationship between node and block at an intermediate node of a tree structure.
Figure 9:
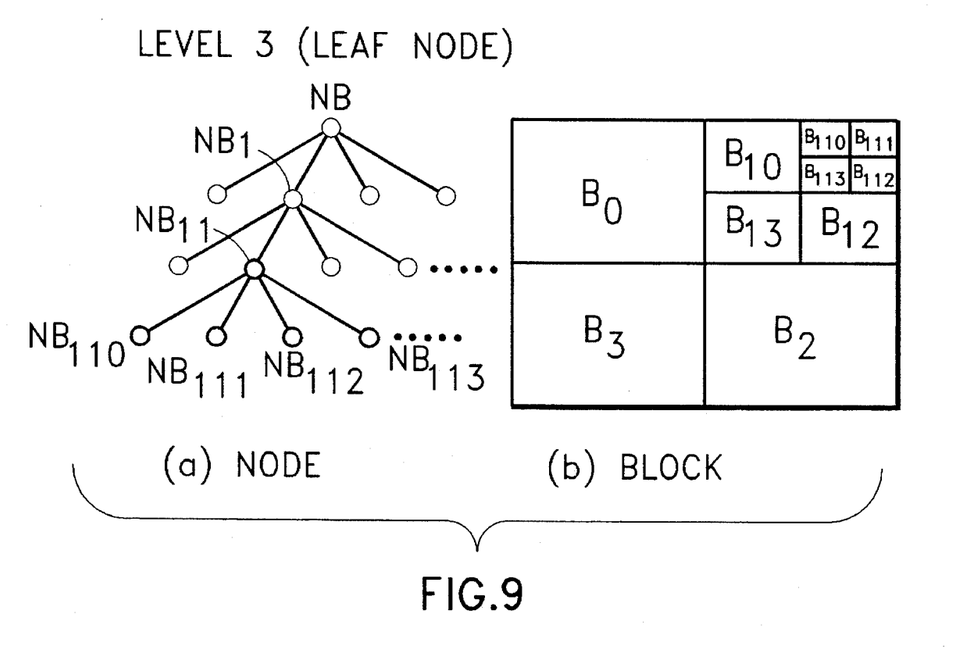
FIG. 9 is a representation conceptually showing the relationship between node and block at a leaf node of a tree structure.

There are various ways of considering neighbor picture elements. For instance, by considering eight neighbor picture elements for picture element $P_{x,y}$ of interest as shown in FIG. 5, calculating the respective averages h, l and s of the values of H, L and S for all the nine picture elements including the objective picture element $P_{x,y}$, and determining to which divisional region of the H-, L- and S-directions the calculated averages h, l and s belong, respectively, the color class of picture element $P_{x,y}$ can be determined.

Although RGB data 28 of an original image by a trichromatic system, HLS data 30 by the perceptual color system converted by color specification conversion unit 20, and color class data 32 determined by color class determination unit 22 are stored in memory 26 (that is, main memory 10 or auxiliary memory 12), HLS data 30 or color class data 32, or both may be directly obtained from the color specification system conversion unit 20 and color class determination unit 22 using RGB data 28 each time they are required.

Now, description is made to the function of tree structure data conversion unit 24, which generates tree structure data 34 using the color class determined by color class determination unit 22. The generated tree structure data 34 is stored in memory 26 in FIG. 1 (that is, main memory 10 or auxiliary memory 12). For simplicity of explanation, description is given in this embodiment to the case that a quadtree is used as the tree structure, but the present invention is not restricted to a quadtree.

If a quadtree is used as the tree structure, RGB data 28 stored in auxiliary memory 12 is divided into a plurality of (2"×2") blocks. For simplicity of explanation, it is supposed than n=3, which means that the tree structure has four levels (n=0 to 3). In FIGS. 6 to 9, the relationship between node NB and blocks B of the image at each level is conceptually shown. Node NB of the highest level (n=0) is called a root node, node NBxxx of the lowest level (n=3) is called a leaf node, and node NBx and NBxx of the other levels (n=1,2) are called intermediate nodes. Generally, the smallest blocks Bxxx corresponding to the leaf nod consist of two or more picture elements, respectively. Of course, a smallest block may consist of one picture element. If the smallest blocks are comprised of a multiplicity of (two or more) picture elements, the amount of memory required for storing tree structure data can be reduced, whereby a color region can be retrieved at a higher speed. The number of picture elements constituting a smallest block may be determined considering the properties of the original image and the picture element density of image input device 8.

Here, it is supposed that a smallest block Bxxx consists of 2×2=4 picture elements and the number of color classes Cm is 64 (m=64), from color class C1 to color class C64. Color index I is represented as an array of color index elements i1 to i64 corresponding to each of color classes C1 to C64, respectively. Each element represents whether picture elements having the color class corresponding to the element are included in the objective block (or how much). The simplest expression method is to express each element in binary.

For instance, if the objective block includes picture elements having the color class corresponding to each element, the element is made one, otherwise it is zero. First, description is given of the color index in which each element is expressed in binary.

For instance, if the four picture elements of block B111 all belong to the same color class C2, the color index I B111 is defined as I B111=(0, 1, 0, . . . , 0) since only the element i2 of the color index corresponding to color class C2 is 1. Similarly, if the color classes of the four picture elements are all the same color class C3, the color index I B111 is defined as I B111=(0, 0, 1, 0, . . . , 0). Also, if the color classes of the four picture elements are color class C1, color class C2, color class C3 and color class C4, respectively, then the color index I B111 of block B111 is defined as I B111=(1, 1, 1, 1, 0, . . . , 0). Next, description is given of how to obtain the color index of the node of the level just above the lowest level node. For instance, the color index I B11 of block B11 consisting of four smallest blocks B110, B111, B112 and B113 is explained as an example.

If the color indexes of blocks B110, B111, B112 and B113 are all the same, the color index of block B11 is also the same as this. If the color indexes I B110, I B111, I B112 and I B113 of the blocks B110, B111, B112 and B113 are I B110=(1, 0, . . . , 0), I B111=(0, 1, 0, . . . , 0), I B112=(0, 0, 1, 0, . . . , 0) and I B113 (0, 0, 0, 1, 0, . . . 0), the color index I B11 of block B11 is defined as I B11=(1, 1, 1, 1, 0, . . . , 0). Thus, the color index of the block just above the four blocks is obtained by O Ring the color indexes of the four blocks just below the block.

Also for block Bx above block Bxx and block B above block Bx, by repeating an operation similar to the above, the respective color indexes I Bx and I B are obtained. By storing the color indexes defined in this way for each node, tree structure data provided with color indexes is generated.

In brief, the method of giving color indexes described above is the simplest method of indexing the color classes of the picture elements included in the block.

Now, description is given on the method of giving color indexes for increasing reliability of retrieval of a color region.

In accordance with the above method of giving color indexes, indexing is provided as to which color classes the picture elements of the block belong to, but in the second method described below, a color index is defined so as to index as to which color classes the picture elements of the block belong and how many of those picture elements there are.

In the second method, frequency is calculated on the color classes of the picture elements included in a block. Such frequency is calculated, in a simple example, by counting the number of picture elements of the same color class. For instance, if the four picture elements constituting block B111 are all of the same color class C1, the total number of picture elements of color class C1 is four, and thus the color index I B111 of block B111 is defined as I B111=(4, 0, . . . , 0). Similarly, if the color classes of the four picture elements are all the same color class C2, the color index I B111 of block B111 is defined as I B111=(0, 4, 0, . . . , 0). In addition, if one of the four picture elements belongs to color class C3 and the remaining three belong to color class C4, the color index I B111 of block B111 is defined as I B111=(0, 0, 1, 3, 0, . . . , 0).

Next, description is given of how to obtain the color index of the node of the level just above the lowest level node. For instance, by way of example, the color index I B11 of block B11 comprised of four smallest blocks B110, B111, B112 and B113 is described.

If the color indexes of blocks B110, B111, B112 and B113 are I B110=I B111=I B112=I B113=(4, 0, . . . , 0), the color index I B11 of block B11 is defined as I B11=(16, 0, 0, . . . , 0). If I B110=(4, 0, . . . , 0), I B111=(0, 4, 0, . . . , 0), I B112=(0, 0, 4, 0, . . . , 0) and I B113=(0, 0, 0, 4, 0, . . . , 0), then the color index I B11 of block B11 is defined as I B11=(4, 4, 4, 4, 0, . . . , 0). Also, if I B110=(1, 2, 1, 0, 0), I B111=(0, 1, 2, 1, 0, . . . , 0), I B112=(0, 0, 1, 2, 1, 0, . . . , 0) and I B113=(0, 0, 0, 1, 2, 1, 0, . . . , 0), then the color index I B11 of block B11 is defined as I B11=1, 3, 4, 4, 3, 1, 0, . . . , 0). I Bxx is constructed so as to have the sum of the values of the corresponding elements of the four blocks I Bxxx just below itself as the respective elements. It is also similar for I Bx and I B. That is, the color index of the block just above the four blocks is constructed so as to have the sum of the values of the corresponding elements of the color indexes of the four blocks just below the block.

In the above described example, as the frequency for color class of the picture elements included in a block, the number of the picture elements of the same color class is counted and the count value is directly used in the simplest example, but it is also possible that the total number of the picture elements included in the block is quantized, and which quantized level the total number of picture elements of a color class of interest belongs to is given as the frequency for that color class. For instance, it is supposed for a certain block (which may be a block of any level) that the block consists of 100 picture elements. This is divided into the respective ranges of 0, 1 to 10, 11 to 20, 21 to 30, . . . , and 91 to 100. Now, taking a color class, the frequency is defined as 0 if the number of the picture elements of that color class is 0, 1 if in the range of 1 to 10,2 if in the range of 11 to 20,3 if in the range of 21 to 30, and so on. The extent and method of quantization are not intended to be limited to this example.

Figure 10:
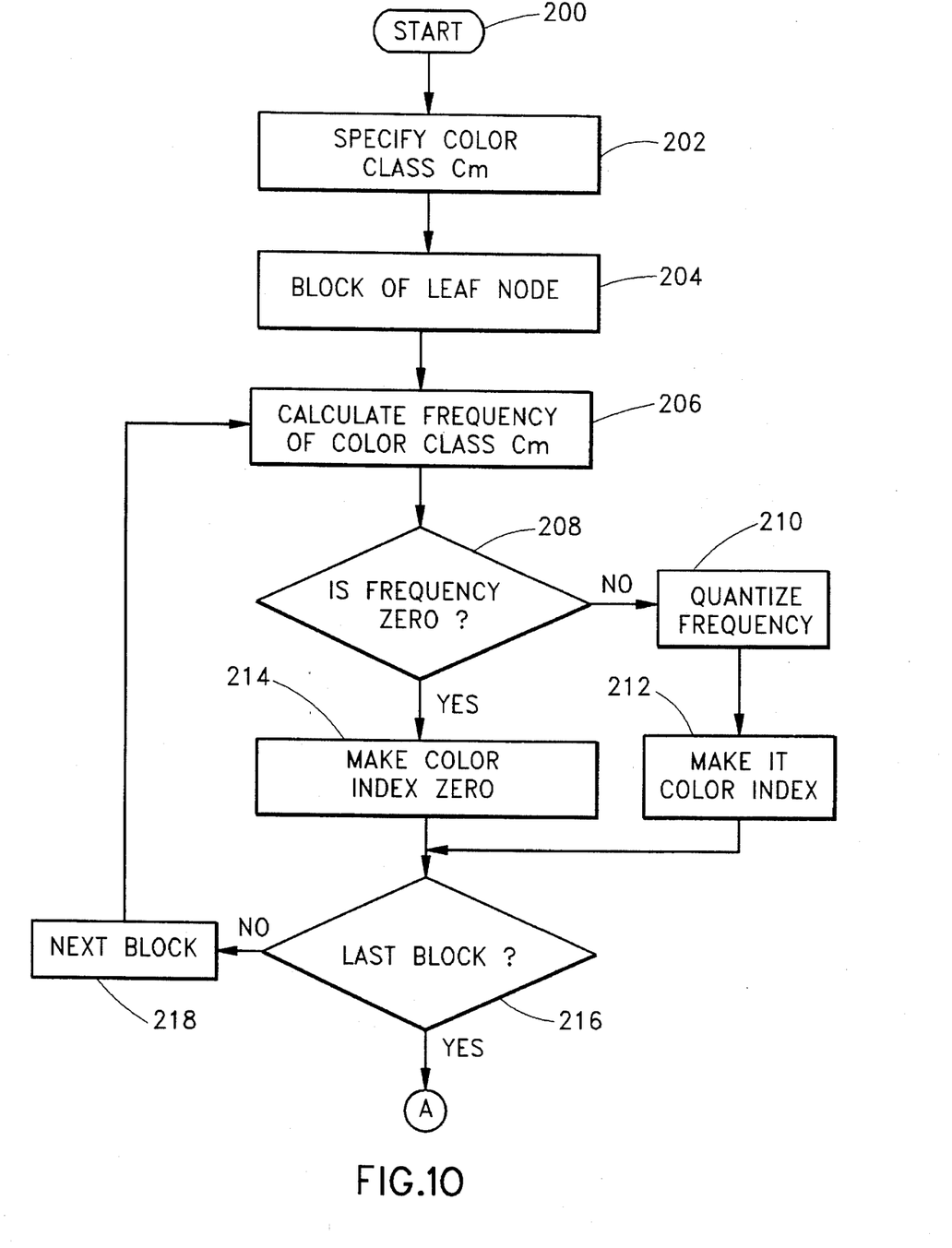
FIG. 10 is a flowchart for the generation of tree structure data of an embodiment according to the present invention.
Figure 11:
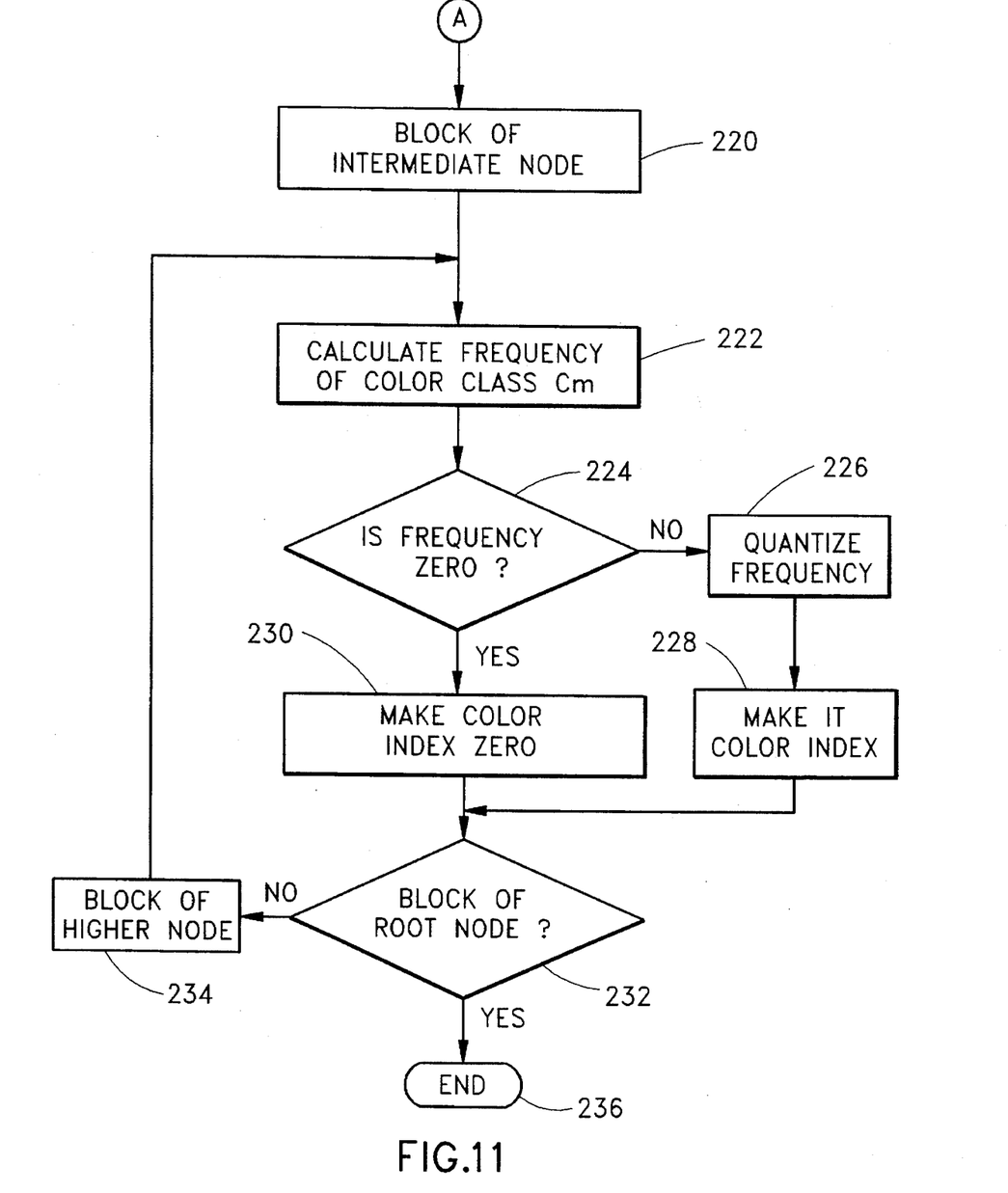
FIG. 11 is a flowchart for the generation of tree structure data of an embodiment according to the present invention.

Steps 200 to steps 236 in FIGS. 10 and 11 show a flowchart of the generation of tree structure data for the case that the total number of picture elements included in a block is quantized, and to which quantization level the total number of the picture elements of a color class of interest belongs is given as the frequency for that color class.

Description is now given of retrieval of a color region using tree structure data 34, to which color indexes were given by tree structure data generating unit 2. Color region retrieval is performed by retrieval unit 4 shown in FIG. 2. Color region retrieval is required, for instance, if the operator wants to change the region of a certain color to another color. In this case, first, it is necessary to successfully detect the blocks of the region of that color. There are various ways for the operator to specify a color. For instance, a method is considered in which a pointing device such as a mouse is used to move a cursor to any position in a region having a desired color on a display screen, and that color is specified by specifying a picture element by using the cursor. As stated above, information on the color of a picture element can be stored in any form of RGB data 28, HLS data 30 or color class data 32. If the color data of a picture element is stored in the form of color class data, specifying the picture element via the cursor allows the color class $C(H_i, L_j, S_k)$ of the picture element to be directly specified. If the color data of picture elements is stored in the form of HLS data, the color class of the picture element is determined by converting the HLS data to color class data by the use of color class determination unit 22. If the color data of a picture element is stored in the form of RGB data, the color class of the picture element is identified by converting the RGB data to HLS data by the use of color specification system conversion unit 20, and further converting the HLS data to color class data with color class determination unit 22.

Alternatively, it may be possible that a plurality of picture elements are specified in a region having a desired color, and that the color class which frequently appears is made to be the color class of that region, or the average of the plurality of picture elements may be calculated and made to be the color class of that region. In the calculation of the average, the respective averages of hue, lightness and saturation are calculated as in the above described color class determination. For instance, if the color data of the picture elements is stored in the form of HLS data, the respective averages h, l and s of the H, L and S values are calculated using the HLS data of each picture element of this plurality of picture elements, and the color class determined by h, l and s is made to be the color class of that region.

Further, it may alternatively be possible that color samples based on other color classes are displayed in addition to the image in a display screen, and the operator may directly specify the samples to identify the color class.

Further, it may alternatively be possible that the operator may directly enter the H, L and S values or the numbers of the color classes from the keyboard 18 etc. to identify the color class.

For the color class $C(H_i, L_j, S_k)$ identified in this way, the tree structure data having color indexes for each node is searched. By searching the tree structure data not only for the identified color class $C(H_i, L_j, S_k)$ but also for color classes C' in the neighborhood of it, reliability of color region retrieval can further be enhanced. For the color class $C(H_i, L_j, S_k)$, near color classes C' are existing in the respective H-, L- and S-directions. That is, near color classes C' are existing in a color space three-dimensionally close to the color class C. The extent of near color classes C' to be searched can freely be set depending on the various conditions such as the properties or the original image and the number of color class divisions.

Figure 15:
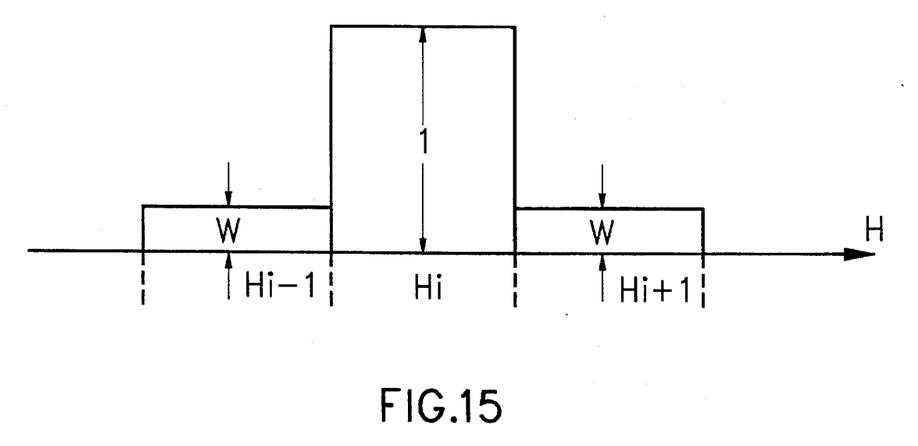
FIG. 15 is a representation explaining how to give the weight of near color classes.

If the extent of near color classes C' to be searched is considered with respect to the H-direction as shown in FIG. 15, because the way of thinking is the same in any direction of the H-, L- and S-directions, then $H_i-1$ and $H_i+1$, in which the hue $H_i$ of the color class $C(H_i, L_j, S_k)$ is slightly different, are the color classes nearest to the identified color class $C(H_i, L_j, S_k)$ in the viewpoint of hue H. As shown in the figure, a color class $C'(H_i-1, L_j, S_k)$ and a color class $C'(H_i+1, L_j, S_k)$ near the color class $C(H_i, L_j, S_k)$ are adapted to have a relatively small weight W (W<1) if the weight of the color class $C(H_i, L_j, S_k)$ is one. If the extent of near color classes is expanded to $H_i-2$ and $H_i+2$, $H_i-3$ and $H_i+3$ and so on, it is only needed to make them have weights which become sequentially smaller as they depart from $H_i$. As the weights of the near color classes, different values may be used in the respective H-, L- and S-directions in consideration of the number of divisions in the respective H-, L- and S-directions and the properties of the original image.

As a simple example, it is supposed that only both neighboring color classes in the respective H-, L- and S-directions of the objective color class $C(H_i, L_j, S_k)$ are near color classes, and their weights are Wh, Wl and Ws, respectively, if the weight of the color class C is supposed to be one. Whereupon, the total number of the near color classes is 27 (=3×3×3) including the color class $C(H_i, L_j, S_k)$. The respective weights of these near color classes are the sum of the weights of the respective H-, L- and S-directions for each color class. For instance, the weight W of a near color class $C'(H_i-1, L_j-1, S_k-1)$ is W=Wh+Wl+Ws, the weight W of a near color class $C'(H_i-1, L_j, S_k-1)$ is W=Wh+1+Ws, and the weight W of the color class $C(H_i, L_j, S_k)$ is W=1+1+1(=3). If the weights of these color classes are standardized with the weight of the objective color class C being one, then, for instance, the weight W of the near color class $C'(H_i-1, L_j-1, S_k-1)$ is W=⅓(Wh+Wl+Ws), and the weight W of the near color class $C'(H_i-1, L_j, S_k-1)$ is W=⅓(Wh+1+Ws). Color classes whose weights W are not zero relative to the objective color class are to be called near color classes. Incidentally, to only define the near color classes, it is sufficient if the weights of the near color classes are all made to be one. The method of defining the weights as described above is very useful for the block detection in a leaf node to be described later. This point is detailed later on.

Since the colors of the near color classes defined as described above are perceptually close to the color of the objective color class, reliability of color region retrieval can be increased. Accordingly, in order to detect the blocks including a specified color, it is only needed to trace a quadtree of color indexes from the upper portion thereof and examine the color index of the color class of the specified color and the color indexes of the near color classes of the color. In an intermediate node, if the color indexes of the color class of the specified color and of its near color classes are zero, the search is stopped since those indexes are always zero in the lower nodes.

The lower nodes are sequentially examined as long as those color indexes are not zero, and when the lowest node or the leaf node is reached, it is determined as follows whether the blocks (smallest blocks) corresponding to the leaf node are blocks to be detected. Incidentally, as to the search method, either the depth priority search or the width priority search may be used. Preferably, a recursive approach is used so that the search algorithm becomes simple.

Now, it is supposed that, since the color index of a color class $C(H_i, L_j, S_k)$ is not zero, one leaf node is reached which corresponds to a smallest block having the picture elements of the color class. If the color index is expressed by a binary value which is zero or one (hereinafter also referred to as binary expression), this block is recorded as a block to be detected. If the color index is expressed by frequency (hereinafter also called frequency expression), the block is recorded as a block to be detected if the block has a frequency exceeding a predetermined threshold value. Incidentally, since the block corresponding to the leaf node searched because of the color index of the color class C(Hi, Lj, Sk) being not zero may include the picture elements of the near color classes C' in addition to the picture elements of the color class C, it is possible that the predetermined threshold value is not reached by examination only of the frequency of the picture elements of the color class C and that block is not successfully detected. Consequently, in the preferred embodiment, this problem is solved by calculating the weighted sum of the frequency of the picture elements of the color class C and the frequency of the picture elements of the above described near color classes C' in consideration of the weights of the near color classes C', and using the frequency of the picture elements calculated as a weighted sum in consideration of weight as the frequency of the picture elements to be compared with the predetermined threshold value. It will be more convenient if the threshold value can freely be set and dynamically varied as the case may be. Also, if the search has reached the leaf node because the color indexes of the near color classes C' are not zero, then the weighted sum of the frequency of the picture elements of the color class C and the frequency of the picture elements of the near color classes C' is similarly calculated in consideration of the weights of the near color classes C', and using the frequency of the picture elements calculated as a weight sum in consideration of weight as the frequency of the picture elements to be compared with the predetermined threshold value, the block is recorded as a block to be detected if such frequency has exceeded the threshold value. In addition, if color indexes are expressed by a binary value, zero or one, the weights W of the near color classes need to be set to one. If color indexes are expressed by a binary value, zero or one, then a smallest block consisting of a plurality of picture elements is recorded as a block to be detected even if it includes only one picture element of the color belonging to a specified color class. This is excellent in that there is no oversight in detection, but conversely, there is also a possibility that a block which should not be detected is detected. Accordingly, to detect blocks having the specified color as accurately as possible, it is desirable that color indexes are expressed by frequency of color classes and blocks having frequency exceeding the predetermined threshold are recorded as blocks to be detected. Color index expression by a binary value which is zero or one (binary expression) is also a frequency expression in a wide sense if the predetermined threshold is considered to be one.

On the other hand, the amount of memory required for storing tree structure data can be less in a binary expression than in a frequency expression. Thus, in the preferred embodiment, tree structure data is constructed by using frequency expression only for the color indexes of the leaf node and binary expression for the color indexes of the nodes other than the leaf node. This allows blocks having a specified color to be accurately detected while suppressing the amount of memory required for storing the tree structure data (which thus enables color region retrieval to be performed at a higher speed).

However, apart from a case where color classes are directly specified, the color specified by the operator is not always in the very center of each of divisional regions Hi, Lj and Sk in the respective H-, L- and S-directions. Thus, if the specified color is not in the center of a divisional region, the deviation from the center is reflected by changing the weights of the near color classes depending on the deviation.

Figure 16:
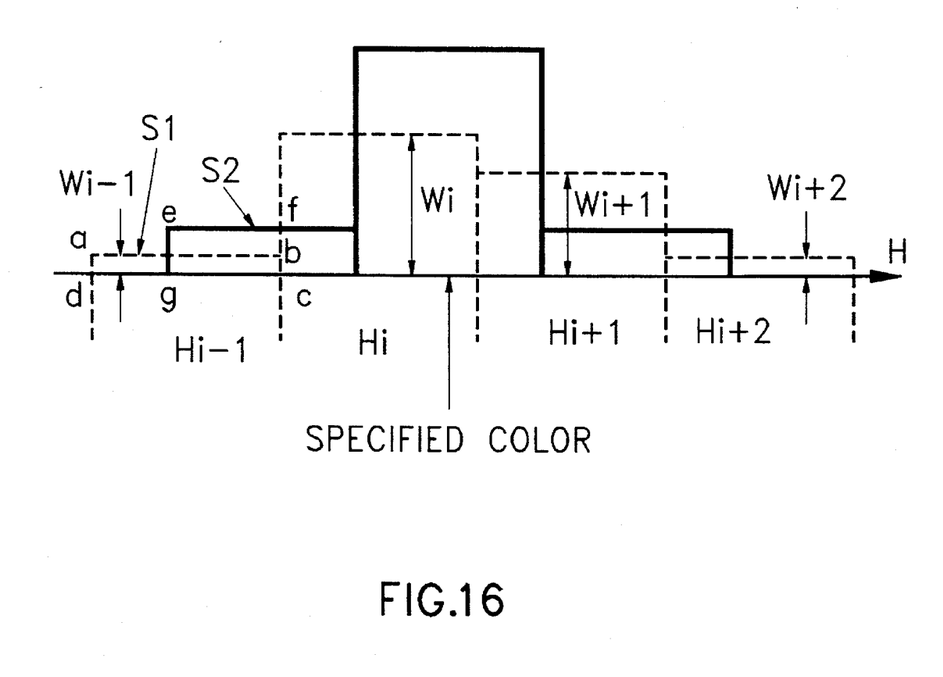
FIG. 16 is a representation explaining how to give the weights of near color classes when a specified color is offset from the center of a color class.

As shown in FIG. 16, if the specified color deviates from the center in a divisional region Hi in the H-direction (in this example, it deviates from the center toward the direction of Hi+1), then, as a simple example, supposing that a region having a weight of one exists over the width of one class centering the specified color, and that regions having a weight of W respectively exist over one class width adjacent of both sides thereof, the weights of the respective divisional regions Hi−1, Hi, Hi+1 and Hi+2 are determined so that the areas in the respective divisional regions Hi−1, Hi, Hi+1 and Hi+2 are equal to each other. For instance, taking the divisional region Hi−1 as an example, the weight Wi−1 of the divisional region Hi−1 is determined so that the area S1 of a quadrangle abcd is equal to the area S2 of a quadrangle cfcg. In addition to the weight of the H-direction, the weights of the respective L- and S-directions are determined in a similar manner, and by adding the weights of the H-, L- and S-directions determined in this way for each color class, the near color classes are defined. The way of adding the weights of the respective directions is similar to the above described case. If deviation from the center is reflected by changing the weights of the near color classes depending on the deviation as described above, the extents of the near color classes would be set somewhat wider as compared with a case where the deviation from the center of the color class of the specified color is not taken into consideration.

Figure 12:
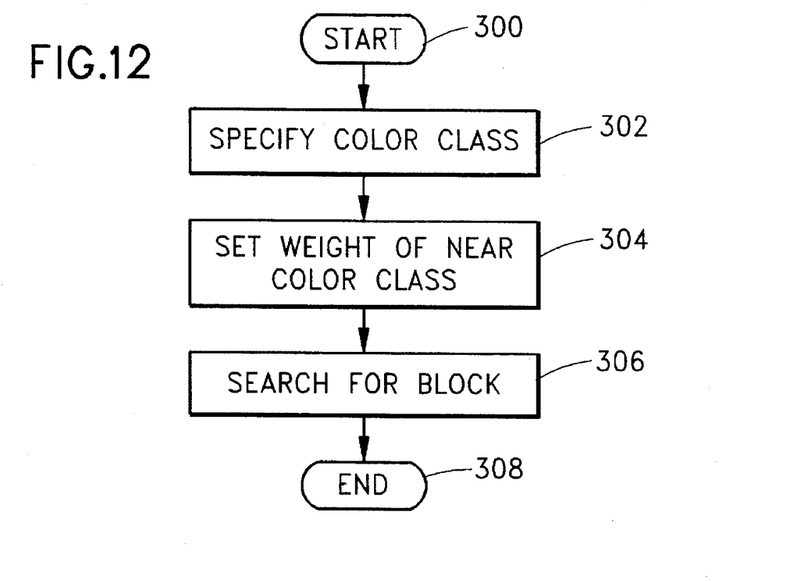
FIG. 12 is a general flowchart for color region retrieval of an embodiment according to the present invention.
Figure 13:
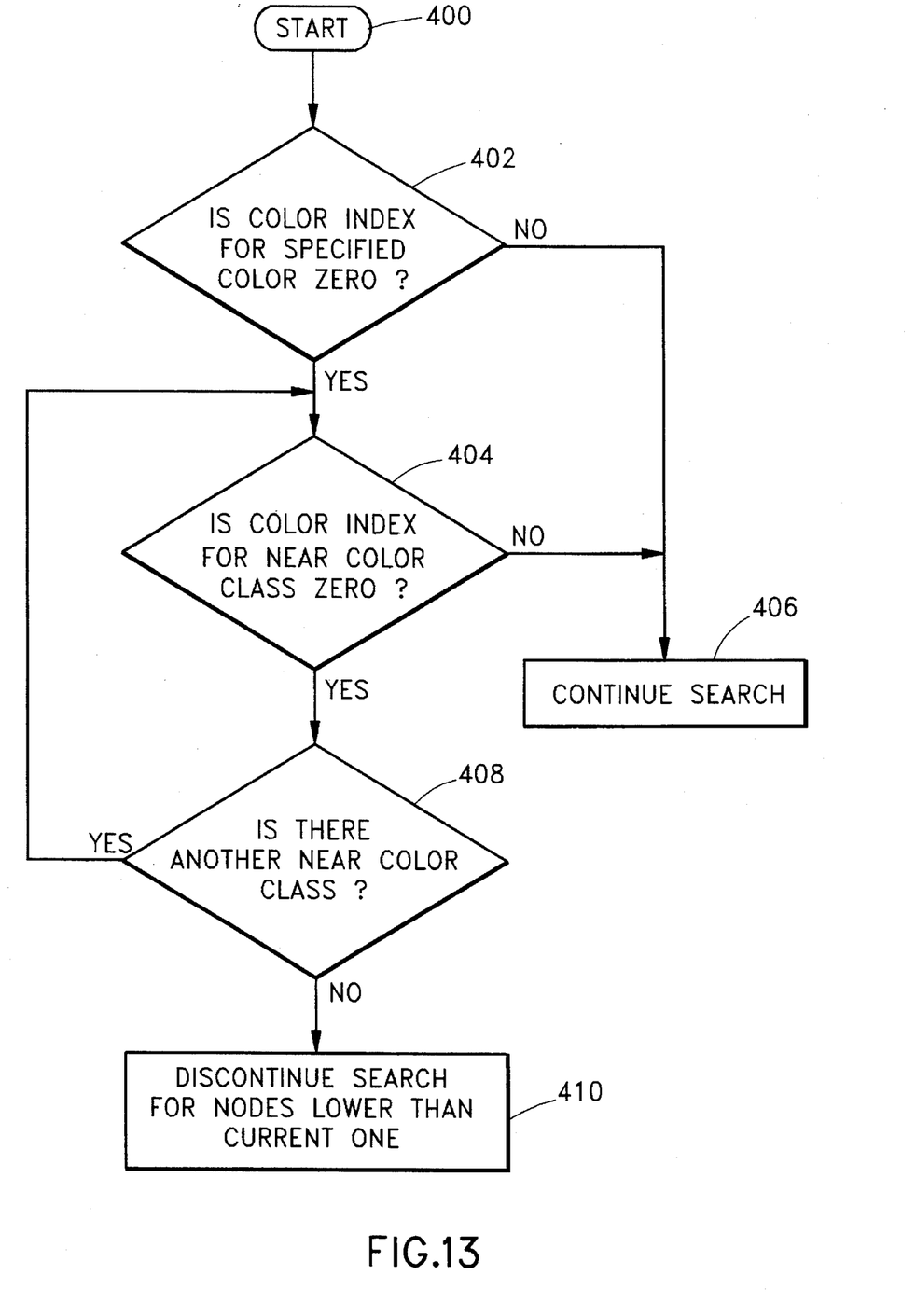
FIG. 13 is a flowchart for block search executed in the nodes other than the leaf node in step 306 of FIG. 12.
Figure 14:
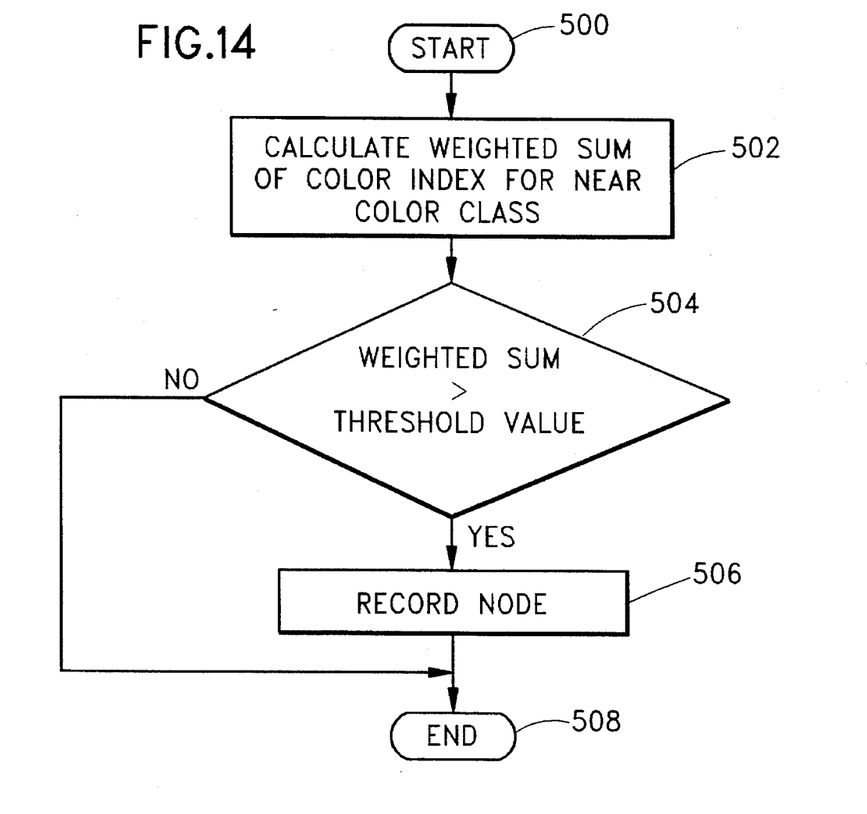
FIG. 14 is a flowchart for a block search executed in the leaf node in step 306 of FIG. 12.

A flowchart of the above described color region retrieval is shown in FIGS. 12 to 14. FIG. 12 shows a general flowchart of the color region retrieval, FIG. 13 shows a flowchart of the block search executed in step 306 of FIG. 12 for the nodes other than the leaf node, and FIG. 14 shows a flowchart of the block search executed in step 306 of FIG. 12 for the leaf node. The weighted sum of color indexes calculated in step 502 of FIG. 14 is the frequency of a color class calculated in consideration of the weights of the above described near classes C'.

As described above, in accordance with the present invention, color region retrieval in a color image can be performed rapidly and reliably by constructing tree structure data provided with color indexes based on a perceptual color system for each node.

Having thus described our invention what we claim as new and desire to secure as Letters Patent, is:

1. A color image region management system comprising:

color class determination means for determining, for each picture element of image data in which color data of each picture element is expressed by a trichromatic system, to which color class the color of the picture element belongs of a plurality of color classes divided on the basis of a perceptual color system, and color index memory means for constructing tree structure data reaching from leaf nodes to a root node, each leaf node including at least one picture element, and calculating, for each node in said tree structure data and for each color class in regards to the picture elements included in the node, a frequency of picture elements which have a color belonging to the color class, and storing in said each node the calculated frequency of picture elements as a color index for each color class.

2. A color image region management system as set forth in claim 1 wherein said frequency of picture elements is calculated for each node in said tree structure data and for each color class in regards to the picture elements included in the node, as a binary number which is one logical value if a picture element having a color belonging to the color class exists, and which is the other logical value if no picture element having a color belonging to the color class exists.

3. A color image region management system as set forth in claim 1 wherein said frequency of picture elements is calculated for each node in said tree structure data and for each color class in regards to the picture elements included in the node, as a count value of the number of picture elements which have a color belonging to the color class.

4. A color image region management system as set forth in claim 1 wherein, if the node in said tree structure data is a leaf node, said frequency of picture elements is calculated, for each color class in regards to the picture elements included in the node, as a binary number which is one logical value if a picture element having a color belonging to the color class exists, and which is the other logical value if no picture element having a color belonging to the color class exists, and if the node in said tree structure data is not a leaf node, said frequency of picture elements is calculated, for each color class in regards to the picture elements included in the node, as a count value of the number of the picture elements which have a color belonging to the color class.

5. A color image region management system as set forth in claim 3 wherein said count value of picture elements is quantized.

6. A color image region management system as set forth in claim 1 wherein at least two picture elements are included in each leaf node.

7. A color image region management system as set forth in claim 1 wherein only one picture element is included in each leaf node.

8. A color image region management system as set forth in claim 1 wherein said color class determination means comprises conversion means for converting color data of each picture element of image data from the trichromatic system to the perceptual color system, and means for dividing a color space based on said perceptual color system into a plurality of color classes and determining to which color class belongs the color converted to the perceptual color system by said conversion means.

9. A color image region management system as set forth in claim 8 wherein said color class determination means determines the color of a picture element as an achromatic color if the saturation of the color of the picture element is smaller than a predetermined value.

10. A color image region management method comprising the steps of:

converting color data of each picture element of image data from a trichromatic system to a perceptual color system, dividing a color space based on the perceptual color system into a plurality of color classes, determining which color class of said plurality of color classes the color of a picture element belongs to, and constructing tree structure data reaching from leaf nodes to a root node, each leaf node including at least one picture element, and for each node in said tree structure data and for each color class in regards to the picture elements included in the node, calculating a frequency of picture elements which have a color belonging to the color class, and storing in said each node the calculated frequency as a color index for each color class.

11. A color image region management system comprising:

an image input device for fetching an original image as image data expressed by a trichromatic system, storage means for storing the image data expressed by the trichromatic system which is output from said image input device, color class determination means for determining, for each picture element of the image data in which color data of each picture element is expressed by the trichromatic system, to which color class the color of the picture element belongs of a plurality of color classes divided on the basis of a perceptual color system, and color index memory means for constructing tree structure data reaching from leaf nodes to a root node, each leaf node including at least one picture element, and for each node in said tree structure data and for each color class in regards to the picture elements included in the node, calculating a frequency of picture elements which have a color belonging to the color class, and storing in said each node the frequency as a color index for each color class.

12. A color image region retrieval method for retrieving a color image region by the use of the tree structure data constructed by the color image region management method as set forth in claim 10 comprising the steps of:

determining the color classes to be retrieved on the basis of a specified color, searching the tree structure data for the determined color classes, in each node other than the leaf node, stopping the search of the nodes lower than itself if a frequency of the picture elements belonging to the determined color classes is zero, and otherwise continuing the search, and in the leaf node, recording the leaf node as the region of the color to be detected if a frequency of the picture elements of the determined color classes is larger than a predetermined value.

13. A color image region retrieval method as set forth in claim 12 wherein said color classes to be retrieved are the color class to which the specified color belongs and color classes perceptually close to the color class to which the specified color belongs.

* * * * *